June 21, 1960 — O. G. ATTEWELL — 2,942,218
CORE FOR ELECTROMAGNETIC INDUCTION APPARATUS
Filed Aug. 8, 1952 — 3 Sheets-Sheet 1

INVENTOR.
Oliver G. Attewell
BY
Attorney

June 21, 1960   O. G. ATTEWELL   2,942,218
CORE FOR ELECTROMAGNETIC INDUCTION APPARATUS
Filed Aug. 8, 1952   3 Sheets-Sheet 2

INVENTOR.
Oliver G. Attewell
BY
Attorney

LEGEND
* — * CORE N°1 DIAGONAL RATIO 1/1
• — • CORE N°2 DIAGONAL RATIO √2
- - - - CORE N°3 DIAGONAL RATIO 2/1
— · — CORE N°4 DIAGONAL RATIO 3/1
— ·· — CORE N°5 DIAGONAL RATIO 4/1
—○— CORE N°6 ROUND WOUND FORM

United States Patent Office 2,942,218
Patented June 21, 1960

2,942,218

CORE FOR ELECTROMAGNETIC INDUCTION APPARATUS

Oliver G. Attewell, Zanesville, Ohio, assignor to McGraw-Edison Company, a corporation of Delaware Filed Aug. 8, 1952, Ser. No. 303,232

2 Claims. (Cl. 336—217)

This invention relates to electromagnetic induction apparatus and in particular to a core made from magnetic strip material and to a method of making such a core so that it possesses exceptional performance qualities.

The performance of an electromagnetic induction apparatus is determined by the magnetic field intensity or magnetizing force required to induce a given amount of flux to flow in the magnetic circuit. Consequently, cores with the greatest performance ability are those in which the least magnetic field intensity is required to induce a given amount of flux. Of course, in cores wound from continuous strip, like those sold under the registered T.M. "Round Wound," as described in Patent No. 2,305,999 to Alwin G. Steinmayer et al. and assigned to the same assignee as this patent application, the flux flows uninterruptedly but cores of this type have limitations as to kva. sizes because of the manufacturing problems involved. For some installations, it is necessary to use cores that can be repaired by opening them in the field. Thus, to build a core that can be formed by interleaving the laminations through the wound coils and in some instances to build a core that can be pulled apart and put together again and at the same time to build a core that carries the flux almost as well as a core of continuous strip is the goal of the entire electromagnetic induction industry.

In cores of the wound, sheared or stacked structure, air gaps have been the greatest impediment to the flow of magnetic flux. These air gaps occur where the ends of two pieces of magnetic steel join. Numerous inventions have been developed for the purpose of lessening this air gap. Abutting ends have been machined to the smoothest perfection so that every part of adjoining pieces will be in perfect contact.

To further aid the flow of flux in stacked cores, magnetic steel has been cut and arranged in various designs that allow the grain direction to more closely correspond with the flux direction. This lessens any impediment which might be caused by the flux crossing the grain.

However, it is believed that there is more impedance to the flow of flux between abutting pieces than when the direction of flux is across the grain. To overcome this impedance to the flux flow at this joint is the fundamental object of this invention.

Another object of this invention is to produce a core in which the pieces abut in a manner such that the reluctance to flow at the joint approaches that of the core material.

A further object of this invention is to provide a core joint between abutting pieces which lessens flux density in the adjacent laminations.

Another object of this invention is to provide an abutting core joint which has a length that is of the order of the $\sqrt{2}$ times the width of the magnetic strip steel or greater.

And still another object of this invention is to provide a core having optimum performance characteristics while being facilely capable of assembly and disassembly.

Other objects will appear from time to time in the course of the specification and claims.

I illustrate my invention in the accompanying drawings, in which:

Fig. 1 illustrates perspectively two views of one method of making this core. View "a" shows the manner of cutting. View "b" shows the manner of restacking.

Fig. 2 is a perspective view of two cores in parallel to form a large core.

Fig. 3 illustrates perspectively two views of another manner of making this core. View "a" shows the manner of cuting. View "b" shows the manner of restacking.

It is generally assumed from experiments that the flux travels in a line with the grain direction of the steel. In strip steel, this direction corresponds with the length of the steel. At a place of division where a cut has been made or two ends abut, the flux flows across this line of abutment. To accomplish this, it is believed that the major portion of the flux flows to an adjacent layer and travels in it across the gap and then flows back to the layer of its original plane after it has crossed the gap. There is, of course, the regular flux in the adjacent layers so that when the flux from the first mentioned strip flows into the adjacent layers, the flux density becomes greater. At this higher density, a greater field intensity is necessary to maintain the flux. Furthermore, the core loss is increased at the higher densities.

It was discovered that by increasing the length of the abutting joint in the direction of the flux flow to the extent of $\sqrt{2}$ times the width of the strip, that the flux flow improved remarkably over the flux flow between abutting ends when the length of the abutting joint was practically the same as the width of the strip.

When the length of the diagonal cut of abutting ends was increased to 2:1 and 3:1 and 4:1 over the width of the strip, the performance of the core showed progressively greater improvement. The relationship between greater length of cut and better flux flow was readily apparent. The improvement in flux flow when the flux had additional space in which to travel indicated that wherever the density of flux is great at a joint, impedance to the flow of the flux is increased. Because of the high reluctance of the air gap, the flux crowds into the adjacent strips.

Figure 5:
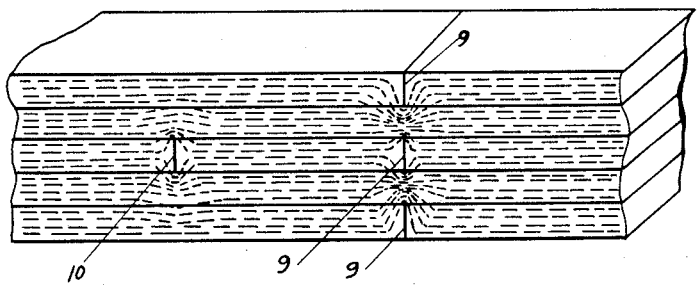
Fig. 5 is a diagrammatic view in elevation illustrating the flux lines in a stack of laminations with right angle butt joints.

In Fig. 5, the dotted lines indicate the flux flow and the path they take where two ends abut. When the strip is cut at right angles to the length, all the flux lines across the strip reach the joint at the same moment and all the flux flows to an adjacent layer at the same moment which causes the adjacent layers to be extremely crowded with flux. Concentrated flux density greatly increases the magnetizing force needed, and it also increases the core loss.

Figure 6:
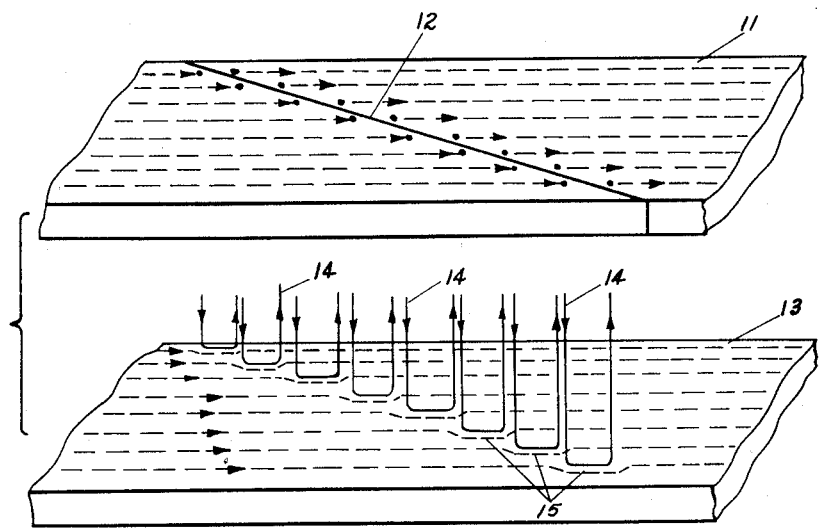
Fig. 6 is a diagrammatic perspective view of two adjacent laminations pulled apart illustrating the path of the flux lines when a diagonal joint is used.

In Fig. 6, I illustrate two adjacent layers pulled apart to better show the flux distribution. The upper layer has a diagonal cut which provides a longer path for the flux to flow to an adjacent lamination. It also distributes the flow of flux into successive stages so that there is only a small increase in the flux density in an adjacent layer contiguous to the joint. This virtually eliminates flux crowding and therefore the flux density at the joint approaches that of the strip.

Figure 7:
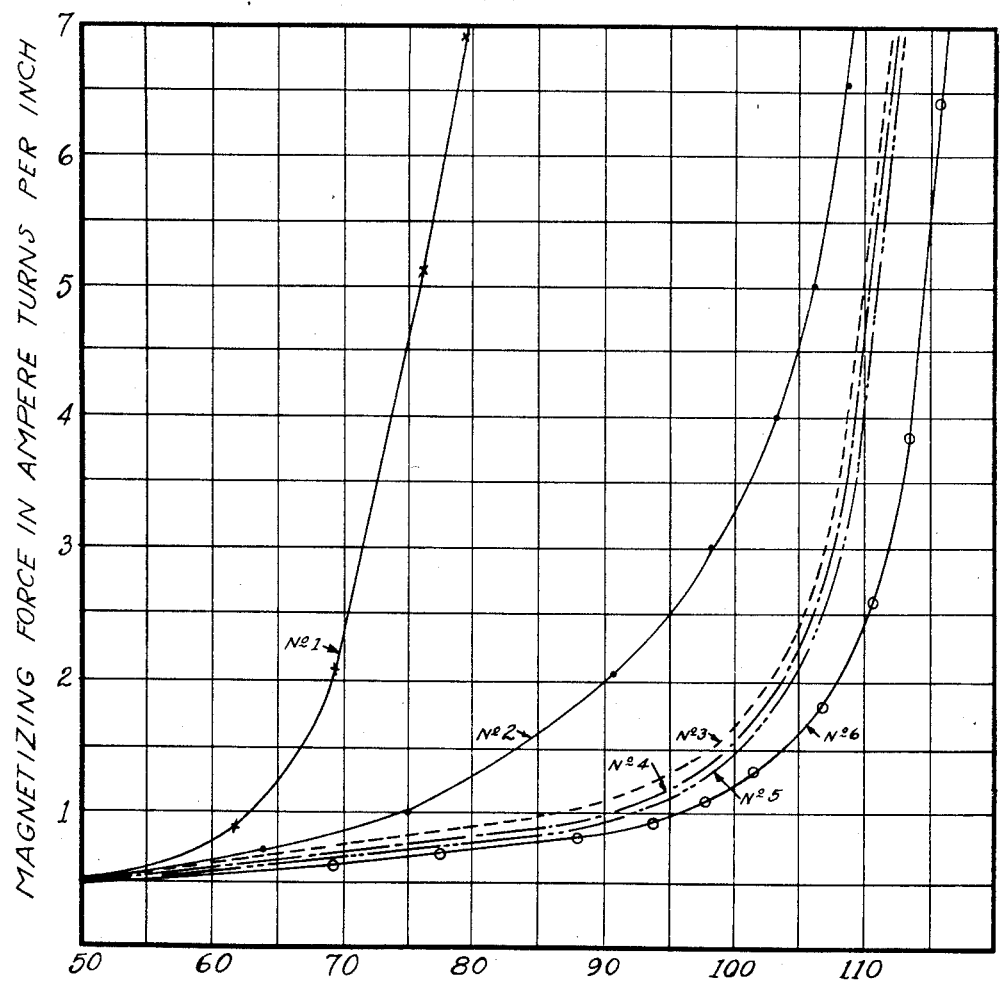
Fig. 7 is a graph showing the comparative performance quality of joints of various angular cuts.

Various tests were made with successively longer diagonal cuts across the strip. In this particular case, the core strips were of a given magnetic characteristic. These comparative tests can be seen on the graph of Fig. 7. A remarkable improvement is evident when the diagonal has a length that is $\sqrt{2}$ times the width of the steel. When the diagonal has a length twice as long as the width of the steel, further improvement is shown. The lengthening of this diagonal in ratio to the width of the steel continues to improve the performance qualities of the core although the comparative improvement above 2:1 is relatively small while the improvement from $\sqrt{2}$ to 2:1 is relatively great.

When the length of the diagonal cut is three times the width of the steel, the core has excellent performance qualities and also the laminations can be handled easily. For the purpose of assembly, it is the preferred form. Some of the cores shown have one cut to a layer and others have two cuts to a layer. Although the core with one cut to a layer shows slightly better performance, the core with two cuts to a layer is the preferred form for facile reassembly.

Figure 2:
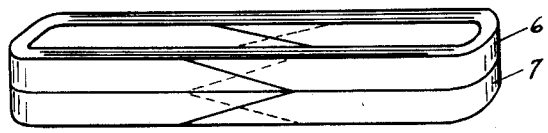

When the diagonal cut is twice the width of the steel, the performance quality is not quite as good as the 3:1 cut but it is sometimes necessary to use it on large cores made with wide strips of steel. A more satisfactory method of making large cores is to use two cores in parallel, the combined width being the width desired. In this way, both cores can be cut with a diagonal length of three times the width of the steel. They can be assembled so that the two diagonals form a V as shown in Fig. 2 or the diagonals can be in parallel or staggered relationship. The method as shown in Fig. 2 showed remarkably better performance qualities than a single core which configuration limited the bias cut ratio to 2:1.

Figure 1:
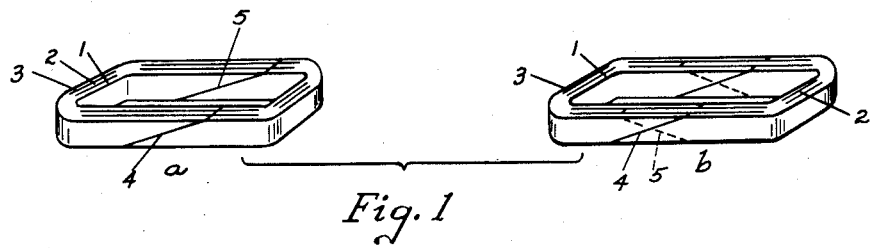

There are numerous ways to make cores utilizing the advantages of a long diagonal cut. Fig. 1 illustrates a core wound from magnetic strip material. I show only three layers 1, 2, and 3 to better illustrate the idea. View "a" shows a long diagonal cut 4 and 5 extending in the same direction in both legs of the core. The core is then restacked as shown in view "b" by reversing the position of alternate laminations so that the diagonal cut of adjacent laminations extends in opposite directions. Lamination 2 is turned so that the diagonal cut 5 is between the diagonal cuts 4 of laminations 1 and 3. If the laminations were transparent, the diagonals in successive layers would look like an elongated X.

Fig. 2 illustrates a manner of applying the cut of Fig. 1 to large cores. In cores of great width, a diagonal cut three times in length the width of the steel would probably not be possible. A 2:1 cut could be used, but if the added benefit of a 3:1 cut is desired, two cores 6 and 7 with a combined width equal to a large core can be placed in parallel as shown in Fig. 2.

Figure 3:
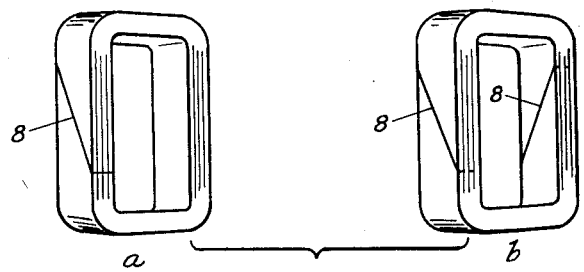

Another method of using the diagonal cut in a magnetic core is shown in Fig. 3. I make a diagonal cut 8 in only one leg of the core as shown in view "a." The laminations are then restacked as in view "b" by reversing alternate laminations so that half of the diagonal cuts are in each leg, with an uncut leg adjacent a diagonally cut leg.

Figure 4:
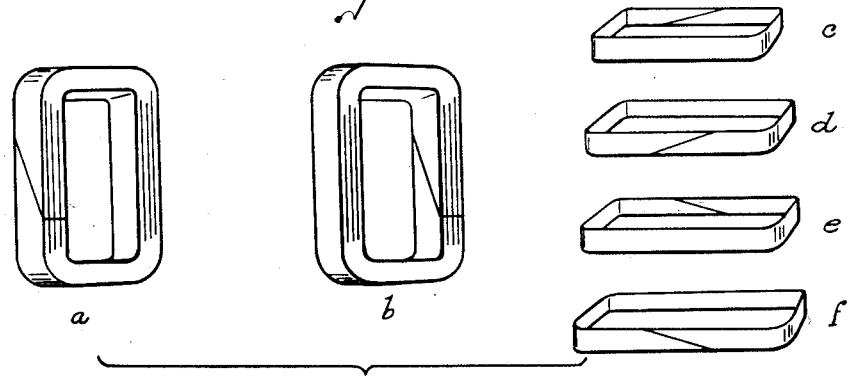
Fig. 4 illustrates perspectively in several views how two cores can be cut and restacked to form two new cores of still another design.

Fig. 4 illustrates still another manner of utilizing the diagonal cut. I use two cores and make one diagonal cut in the same direction in opposite legs of each core, as shown in views "a" and "b." Two new cores can then be built by restacking the laminations from cores "a" and "b" into the order shown in the exploded nest form of views "c," "d," "e," and "f." Lamination "c" comes from core "b," lamination "d" comes from core "a," lamination "e" is a result of reversing core "a" and lamination "f" is a result of reversing core "b." The new cores consist of alternate layers of uncut legs adjacent to diagonally cut legs and the successive diagonals alternating in direction.

The method of making a magnetic core such as is illustrated in Fig. 4 has a definite performance advantage over the core of Fig. 3. The core shown in Fig. 3 consists of alternate layers of uncut strips adjacent to diagonally cut strips with the successive diagonals extending in the same direction. Thus, the corresponding abutting ends are separated by only one layer or lamination of unbroken steel. In the core of Fig. 4, alternate layers of uncut strips are adjacent to diagonally cut strips but the successive diagonals in alternate strips extend in opposite directions. Therefore, in comparison there is approximately three times the effective cross-sectional area along any increment of corresponding abutting ends through which substantially the same increase of flux flows. In the core of Fig. 4, the increase in flux density in the strips adjacent to a joint is approximately one-third of the increase in flux density in the core of Fig. 3. This results in better core performance.

Although it is not shown in the drawings, the core of Fig. 4 can be adapted to a shell-type transformer by taking the two cores "a" and "b" and restacking the laminations so that when the two cores are used together, the two inner legs consist of uncut layers while the two outer legs consist of layers with diagonal cuts extending in opposite directions in adjacent layers.

Although I illustrate core laminations of considerable thickness, the magnetic strips may be extremely thin. In some instances, it may be desirable to use several laminations as a group or a layer and in the restacking to reverse the position of alternate layers. The term "lamination" is used to designate an individual strip of magnetic material while the term "layer" can be one or more strips handled together as a group.

Fig. 5 illustrates right angle butt joints 9 and shows the flux by means of dotted lines traveling around the butt joint. Even though the butt joints are in alternate layers, the crowding of flux lines is readily apparent. With a right angle butt joint most of the flux lines reach the joint at the same moment and flow at approximately the same moment to an adjacent layer that already has the same amount of flux traveling in it, and consequently a congested condition prevails which impedes the normal flow of flux.

The congestion is not quite as serious when the right angle butt joints are offset circumferentially of the core relative to the other butt joints as in the case of joint 10. Nevertheless, the crowding is still a retarding factor and tests show a tremendous difference of performance in a core with right angle joints 9 or 10 of Fig. 5 and the diagonal joint of Fig. 6.

Fig. 6 illustrates two adjacent layers pulled apart. The upper layer 11 has a long diagonal cut 12 across it, while the adjacent layer 13 is uncut. The dotted lines indicate the flux paths and it can be seen that the flux lines reach the diagonal abutment in successive order. Only a small portion of the flux crosses at a time. Lines 14 indicate the path of the flux to an adjacent layer and the approximate amount of increased flux at any cross-section perpendicular to the strip length in layer 13. As a very small amount of flux from layer 11 enters layer 13 at any given increment of the cut, the increase in flux density in layer 13 is reduced to a minimum. Flux depressions 15 pictorially illustrate the probable extent.

It is to be understood that the above theory is only an attempt to explain why this core attains superior results but I do not want to be limited in any degree by it. Others may advance different reasons for the superiority of magnetic cores of this type.

Comparative tests are shown on the graph of Fig. 5. The ampere turns is the product of the number of turns of the coil around the core leg and of the current flowing through the coil. The flux density in kilolines per square inch is indicated by the vertical lines and the magnetic field intensity in ampere turns per inch is indicated by the horizontal lines.

For a typical case, curve No. 1 shows the amount of field intensity necessary to induce a given flux desity in a core that has butt joints cut at right angles to the magnetic strip material. No. 2 curve shows the same thing when the butt joint has a length $\sqrt{2}$ times the width of the steel. In this case, the magnetizing force necessary to induce a certain flux density is reduced. The performance record of a diagonal joint which is twice as long as the width of the steel is shown by the curve of core No. 3. The No. 4 curve shows the results of a diagonal cut which is three times as long as the width of the steel. And the No. 5 curve shows the performance quality of a core with diagonal joints which are four times in length the width of the magnetic steel. Curves 3, 4 and 5 run quite closely together, especially curves 4 and 5. They require approximately the same magnetizing force to produce any given density.

This performance record is so very good that it is almost as good as a "Round Wound" core which has no joints at all but is formed of continuous magnetic strip material. Curve No. 6 shows the quality of "Round Wound" cores.

I have varied the length of the cut for adjoining pieces from a right angle cut to a diagonal cut with a length four times the width of the steel. A remarkable improvement in performance was noticeable as the butting joints became proportionately greater in length to the width of the steel. Since quality of performance is the result of inducing a given amount of flux to flow with a minimum magnetizing force and of low core loss, I realized that the distribution of the flux flowing around an air gap was an important factor. When the flux in a strip was not crowded spatially simultaneously into an adjacent strip, the increase in flux density of adjacent strips was minimized and hence, less magnetizing force was needed to make the flux flow across the joint. When the flux came to the joint in successive stages and consequently were crossing in successive order, the magnetizing force to maintain the flux at the joint was greatly reduced. Consequently, I concluded that as the distance along the strip length in which the flux cross from one piece to the next became greater, the performance of the resulting core became better.

Although I have used the term "diagonal" to describe the cut end of a lamination, other types of bias cuts could be used such as a curved cut or a stepped cut and so I do not wish to be limited to a straight diagonal cut across the end of a lamination. The general direction of the cut, however, would be in a diagonal direction across the strip. It may form a zigzag or curved path but in relation to an edge of the strip, its general direction will be diagonal. It is not necessary that the adjoining strip ends meet in perfect abutment, or that the adjoining ends have complementary cuts.

Furthermore, the basic element of this invention, the long diagonal cut, is applicable to all types of core construction known to those versed in the art. It can be used on the core type, the shell-type, and the three phase type and so I do not wish to be limited to only the types illustrated herein.

Although in all the drawings the diagonal cut joint is shown on a leg portion of the core, it is obvious that the joint or joints may be located in the yoke, or the corners or any portion of the core where it is desired.

This discovery is a radical innovation from all previous methods of manufacturing cores. It provides a new method of core construction that reduces the magnetizing force necessary to induce flux to flow. This fills a long needed improvement for increasing the efficiency of a core. It opens new fields and provides a very significant advance in the electromagnetic field. Further, an important aspect of this invention is that while it improves core performance, it also permits the facile manufacture and repair of electromagnetic apparatus.

I claim:

1. In combination, a plurality of laminations of magnetic material forming a closed magnetic core, the ends of said laminations being closely adjacent and forming at least one butt joint in each layer intermediate the corners of said core, the butt joints in adjacent layers being non-coincident, each of said butt joints being contiguous the uncut surface of an adjoining layer for the major portion of the length of said joint, the length of the ends of said laminations at each said joint being sufficiently greater than $\sqrt{2}$ times the lamination width than the area of magnetic material in a cross section through said adjoining layer along the line of said butt joint is substantially equal to that in a cross section through both said layer and said adjoining layer taken perpendicular to the longitudinal axis of said laminations.

2. In combination, a plurality of laminations of magnetic material forming a closed four-sided magnetic core, the ends of said laminations being closely adjacent and forming at least one butt joint in each layer intermediate the corners of said core, the butt joints in adjacent layers being non-coincident, each of said butt joints being contiguous the uncut surface of an adjoining lamination for the major portion of the length of said joint, the length of the ends of said laminations at each butt joint being greater than twice the width of the laminations.

References Cited in the file of this patent

UNITED STATES PATENTS

| | | |
|---|---|---|
| 581,873 | Thomson | May 4, 1897 |
| 1,935,426 | Acly | Nov. 14, 1933 |
| 2,467,867 | Somerville | Apr. 19, 1949 |
| 2,486,220 | Somerville | Oct. 25, 1949 |
| 2,579,578 | Horstman et al. | Dec. 25, 1951 |
| 2,603,691 | D'Entremont | July 15, 1952 |

FOREIGN PATENTS

| | | |
|---|---|---|
| 493,154 | Belgium | May 2, 1950 |

OTHER REFERENCES

A.I.E.E. Technical Paper, 52–90, "Characteristics of Overlapping Joints in Magnetic Circuits," December 1951.